United States Patent [19]
Pitt

[11] 4,011,754
[45] Mar. 15, 1977

[54] FLOWMETER

[75] Inventor: Gillies D. Pitt, Harlow, England

[73] Assignee: International Standard Electric Corporation, New York, N.Y.

[22] Filed: June 7, 1976

[21] Appl. No.: 693,526

[52] U.S. Cl. .................... 73/194 VS; 250/227
[51] Int. Cl.$^2$ ........................... G01F 1/32
[58] Field of Search ............... 73/194 VS; 250/227

[56] References Cited
UNITED STATES PATENTS

| 2,813,424 | 11/1957 | Liepmann et al. | 73/194 X |
| 2,869,366 | 1/1959 | Nitikman | 73/194 |

Primary Examiner—Herbert Goldstein
Attorney, Agent, or Firm—A. Donald Stolzy

[57] ABSTRACT

In a vortex shedder the rate of flow is determined from the rate at which vortices are shed from a bluff body normally incorporating flexible capacitor plates at its sides which produce a signal when each vortex is detected. In this flowmeter the bluff body is a mere solid body and the vortices are detected downstream with an unclad section of optical fiber the attenuation of which changes in the presence of a vortex because of the change of refractive index associated with a vortex.

11 Claims, 1 Drawing Figure

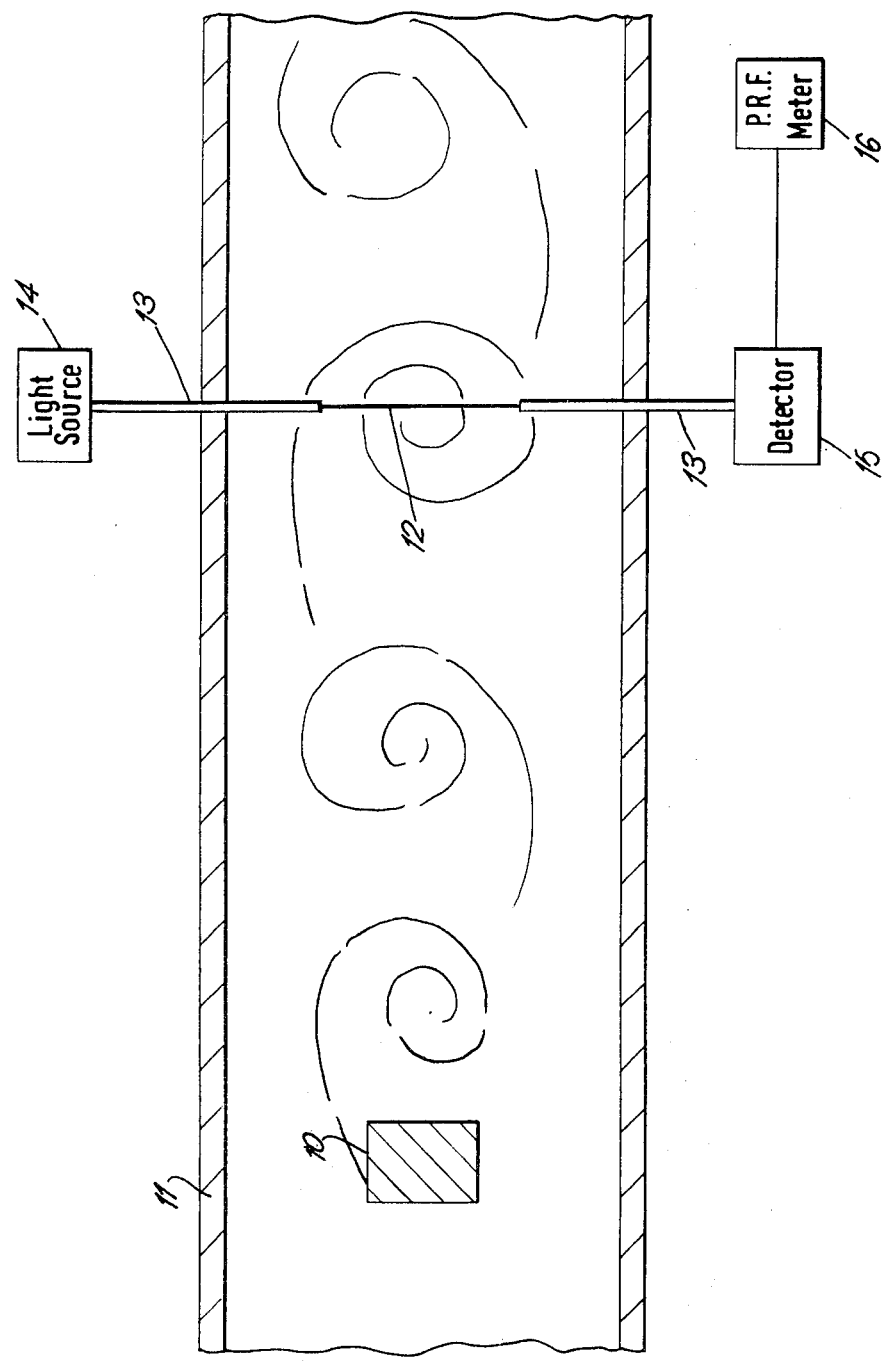

FLOWMETER

BACKGROUND OF THE INVENTION

This invention relates to flowmeters, and more particularly to those utilizing vortex shedding.

Vortex shedding is a phenomenon which occurs when a fluid flows past a bluff (unstreamlined) body. Boundary layers of a slow-moving viscous fluid are formed along the outer surface of the body, and because it is not streamlined, the flow cannot follow the contour of the body but separate themselves from the body, become detached, and roll themselves up into vortices. A vortex of one rotational sense is shed from one side of the body. The next vortex to be shed is then shed with an opposite rotational sense. The rate of vortex shedding is proportional to flow rate. While the phenomenon has long been known, an impediment to the utilization of the phenomenon for measuring flow rates has been the difficulty in detecting the vortices.

One form of prior art flowmeter of the above-described type employs a special construction of bluff body to detect the vortices as they are formed. For this purpose the body is provided with flexible side walls, each forming one plate of a capacitor. The other such plate is located inside the bluff body. The formation of a vortex produces an area of reduced pressure on one side of the body, and a corresponding area of increased pressure on the other. This pressure differential and its reversal, when the next succeeding vortex begins to form, is detected by the capacitance change resulting from the flexure of the side walls.

According to the present invention, there is provided a flowmeter utilizing vortex shedding and having a light source coupled with a detector via a length of optical fiber including an unclad portion positioned in the path of vortices shed from a bluff body and wherein the output of a detector is fed to the input of a pulse repetition frequency meter. The light source is not necessarily an emitter in the visible region of the spectrum but may alternatively be an IR or UV emitter.

In the present invention the bluff body merely serves to generate the vortices, and the vortices themselves are detected, rather than their generation.

When an unclad optical fiber is immersed in a medium of lower refractive index, that medium acts as a cladding for the fiber in providing a guiding interface for light propagating aong the fiber. When, however, the fiber is immersed in a medium whose refractive index is equal to or greater than that of the fiber, the interface is no longer guiding, with the result that the optical attenuation of the fiber is increased. A vortex produces a localized change in refractive index in a medium and hence when a vortex comes into contact with an unclad fiber having a refractive index not much greater than that of the bulk medium, the optical attenuation of that fiber is temporarily modified until the vortex dies out or moves away.

The above-described and other advantages of the present invention will be better understood from the following detailed description when considered in connection with the accompanying drawings.

BRIEF DESCRIPTION OF THE DRAWING

In the drawing which is to be regarded as merely illustrative:

The FIGURE is a longitudinal sectional view of a flowmeter constructed in accordance with the present invention.

DESCRIPTION OF THE PREFERRED EMBODIMENTS

A rectangular cross section bluff body 10 is located in a pipe 11 in the drawing. Downstream of this bluff body 10 is located an unclad section 12 of an optical fiber 13 linking a light source 14 with a detector 15. The output of the detector 15 is fed to a pulse repetition frequency meter 16.

In a typical instrument the length of the bluff body 10 (measured in the direction of flow) is about two-thirds of its width, and the diameter of the pipe 11 is between 3 and 5 times the width of the bluff body 10.

The unclad section 12 of optical fiber 13 has to have a refractive index not much greater than that of the liquid, the flow of which is to be measured. Such fibers can readily be made with refractive indices covering the range from 1.3 to 1.7. At the lower end of the range these will be made of a plastic material, whereas elsewhere in the range they may be made of glass.

What is claimed is:

1. A flowmeter comprising: a conduit section for providing a fluid flow path; a body fixed relative to said conduit section inside thereof in a position and being constructed to cause vortex shedding in a fluid flowing in a predetermined direction in said conduit section; an optical fiber supported inside said conduit section downstream of said body in a position such that light passing therethrough is modulated by vortices created by said body, said fiber having a refractive index somewhat greater than that of said fluid; and sensor means connected from said fiber to sense changes in the illumination transmitted thereby.

2. The inention as defined in claim 1, wherein said fiber has a bare portion located inside said conduit.

3. The invention as defined in claim 2, wherein said sensor means includes a light source mounted in a position fixed relative to said conduit section to supply light to one end of said fiber.

4. The invention as defined in claim 3, wherein said sensor means includes a light detector mounted in a position fixed relative to said conduit section to receive light from the other end of said fiber.

5. The invention as defined in claim 4, wherein a pulse repetition frequency meter is connected from the output of said detector.

6. The invention as defined in claim 2, wherein said sensor means includes a light detector mounted in a position fixed relative to said conduit section to receive light from one end of said fiber.

7. The invention as defined in claim 6, wherein a pulse repetition frequency meter is connected from the output of said detector.

8. The invention as defined in claim 1, wherein said sensor means includes a light source mounted in a position fixed relative to said conduit section to supply light to one end of said fiber.

9. The invention as defined in claim 8, wherein said sensor means includes a light detector mounted in a position fixed relative to said conduit section to receive light from the other end of said fiber.

10. The invention as defined in claim 1, wherein said sensor means includes a light detector mounted in a position fixed relative to said conduit section to receive light from one end of said fiber.

11. The invention as defined in claim 10, wherein a pulse repetition frequency meter is connected from the output of said detector.

* * * * *